(12) United States Patent
Donnelly

(10) Patent No.: US 9,505,896 B2
(45) Date of Patent: Nov. 29, 2016

(54) FOAMING OF THERMOPLASTIC MATERIALS WITH ORGANIC PEROXIDES

(75) Inventor: Zuzanna Donnelly, Ardmore, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/124,003

(22) PCT Filed: May 25, 2012

(86) PCT No.: PCT/US2012/039495
§ 371 (c)(1),
(2), (4) Date: Dec. 5, 2013

(87) PCT Pub. No.: WO2012/170215
PCT Pub. Date: Dec. 13, 2012

(65) Prior Publication Data
US 2014/0107240 A1    Apr. 17, 2014

Related U.S. Application Data

(60) Provisional application No. 61/494,513, filed on Jun. 8, 2011.

(51) Int. Cl.
*C08J 9/00* (2006.01)
*C08J 9/02* (2006.01)

(52) U.S. Cl.
CPC ........... *C08J 9/0023* (2013.01); *C08J 2300/16* (2013.01); *C08J 2367/04* (2013.01)

(58) Field of Classification Search
None
See application file for complete search history.

(56) References Cited

U.S. PATENT DOCUMENTS

| | | | |
|---|---|---|---|
| 5,798,435 A | 8/1998 | Gruber et al. | |
| 6,096,810 A | 8/2000 | Asrar et al. | |
| 6,166,094 A | 12/2000 | Mauk et al. | |
| 6,559,244 B1 | 5/2003 | Sodergard et al. | |
| 7,393,590 B2 | 7/2008 | Scheer et al. | |
| 7,553,919 B2 * | 6/2009 | Narayan et al. | 527/300 |
| 7,947,754 B2 | 5/2011 | Okuda et al. | |
| 2001/0051693 A1 * | 12/2001 | Seo et al. | 525/437 |
| 2005/0043419 A1 | 2/2005 | Kim et al. | |
| 2008/0317990 A1 | 12/2008 | Runyan et al. | |
| 2009/0124723 A1 | 5/2009 | Hogt et al. | |
| 2010/0056656 A1 | 3/2010 | Matsuoka et al. | |
| 2010/0210745 A1 | 8/2010 | McDaniel et al. | |

FOREIGN PATENT DOCUMENTS

| | | |
|---|---|---|
| JP | 2007-209515 | 8/2007 |
| WO | WO 2010008447 A1 * | 1/2010 |
| WO | WO 2010/065053 A1 | 6/2010 |
| WO | WO 2010065053 A1 * | 6/2010 |
| WO | WO 2010/118041 A1 | 10/2010 |
| WO | WO 2010118041 A1 * | 10/2010 |

OTHER PUBLICATIONS

Shigeo Nakamura, Yoshiharu Doi, Mariastella Scandola, "Microbial Synthesis and Characterizations of Poly(3-hydroxybutyrate-co-4-hydroxybutyrate)", Aug. 17, 1992, Macromolecules, vol. 25, No. 17, pp. 4237-4241.

* cited by examiner

*Primary Examiner* — Kara Boyle
(74) *Attorney, Agent, or Firm* — Lynn B. Morreale

(57) ABSTRACT

A method for making foamed thermoplastic materials includes processing a composition that contains (a) at least one thermoplastic material selected from one or more polyhydroxyalkanoates (PHAs), poly(lactic acid) (PLA), or combinations thereof; and (b) at least one organic peroxide under conditions effective to permit the composition to foam. The foamed thermoplastic materials provide a low density and lightness in weight, can be used in a variety of useful articles spanning many industries, and can have, depending on the choice of thermoplastic materials, excellent biodegradability compared to foamed polymers derived from non-renewable resources.

16 Claims, No Drawings

FOAMING OF THERMOPLASTIC MATERIALS WITH ORGANIC PEROXIDES

CROSS-REFERENCE TO RELATED APPLICATIONS

This application is a national stage application under 35 U.S.C. §371 of PCT/US2012/39495, filed May 25, 2012, which claims benefit to U.S. provisional application No. 61/494,513 filed on Jun. 8, 2011, all of which are hereby incorporated by reference.

FIELD OF THE INVENTION

This invention relates to methods and compositions for making foamed thermoplastic materials. An embodiment of the method comprises processing compositions that contain (a) at least one thermoplastic material selected from one or more polyhydroxyalkanoates (PHAs), poly(lactic acid) (PLA), or combinations thereof; and (b) at least one organic peroxide under conditions effective to permit the composition to foam. Foamed thermoplastic materials of the present invention provide a low density and lightness in weight, can be used in a variety of useful articles spanning many industries, and depending on the choice of thermoplastic material can have biodegradability.

BACKGROUND OF THE INVENTION

Growing global concern over persistent plastic waste has generated much interest in biodegradable polymers for everyday use. Biodegradable polymers based on polyhydroxyalkanoates (PHAs) and poly(lactic acid) (PLA) are an attractive alternative as they can be readily produced from renewable agriculture resources. Recent developments in manufacturing polymers from agricultural sources have accelerated the emergence of these polymers in the biodegradable plastic commodity market.

The commercial potential for PHAs and PLA spans many industries, and is derived primarily from advantageous properties which distinguish PHA and PLA polymers from non-biodegradable polymers. Widespread use of PHAs and PLA, however, has been hindered by difficulties in developing acceptable means by which these biodegradable polymers can be efficiently and economically processed into commercially attractive products. One important application of biodegradable polymers is in the area of disposable, one-time use items, such as containers and food packaging. There is a need for foamed thermoplastic materials that have a low density, lightness in weight, and enhanced biodegradability compared to foamed polymers derived from non-renewable resources.

SUMMARY OF THE INVENTION

An embodiment of the present invention provides a method for making a foamed thermoplastic material comprising processing a composition that contains (a) at least one thermoplastic material selected from one or more polyhydroxyalkanoates (PHAs), poly(lactic acid) (PLA), or combinations thereof; and (b) at least one organic peroxide under conditions effective to permit said composition to foam. An additional embodiment of the invention provides a foamed thermoplastic material obtained by the method described above. In some embodiments, the thermoplastic material is at least in part biodegradable or is prepared at least in part from biobased materials.

DETAILED DESCRIPTION OF THE INVENTION

All references disclosed herein are incorporated by reference herein in their entirety.

"Copolymer" means polymers containing two or more different monomers.

"Biodegradable" means capable of undergoing decomposition into simpler substances (elements and compounds) in aerobic and anaerobic environments.

"Biobased material" means a material that is composed or made from in whole, or in significant part, of biological products or renewable materials such as plants, animals, marine materials or forestry materials.

"Polyhydroxyalkanoate" ("PHA") are a family of biodegradable polyesters that are synthesized by certain strains of bacteria from glucose and oxygen. PHA as used herein refers to a polymer or copolymer containing at least 50 mole percent of PHA monomer units, which have the following general structure:

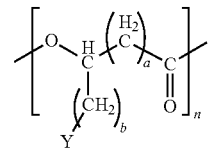

where n is an integer, a is 1 to 4, b is 0 to 19, and Y is H. In some embodiments, a is 1 to 2, b is 0 to 15. In other embodiments, a is 1 to 2 and b is 0 to 7.

PHAs are produced directly via fermentation of carbon substrate within the microorganism. The PHA accumulates as granules within the cytoplasm of cells and serves as a microbial energy reserve material. PHAs have a semicrystalline structure, the degree of crystallinity ranging from about 40% to around 80%.

Examples of PHAs include, but are not limited to:
(1) poly(3-hydroxybutyrate), P(3HB), generic formula with a=1, b=1, Y=H (—$(CH_2)_b$—Y) is methyl)
(2) poly(3-hydroxyvalerate), P(3HV), generic formula with a=1, b=2, Y=H and (—$(CH_2)_b$—Y) is ethyl);
(3) poly(3-hydroxyhexanoate), P(3HHx), generic formula with a=1, b=3, Y=H (—$(CH_2)_b$—Y) is propyl);
(4) poly(3-hydroxyoctanoate), P(3HO), generic formula with a=1, b=5, Y is H (—$(CH_2)_b$—Y) is pentyl);
(5) poly(3-hydroxydecanoate), P(3HD), generic formula with a=1, b=7, Y=H (—$(CH_2)_b$—Y) is heptyl);
(6) the medium-chain-length poly(3HOd), generic formula with a=1, b=15, and Y=H; and
(7) poly(4-hydroxybutyrate), generic formula with a=2, b=0 and Y=H.

In some embodiments, the number average molecular weight of PHAs may range for example from about 10,000 to about 200,000.

Copolymers of PHAs vary in the type and proportion of monomers, and are typically random in sequence. For example, poly(3-hydroxybutyrate-co-3-hydroxyvalerate), P(3HB-co-3HV) is made up of a random arrangement of the monomers where a is 1 for both monomers, and b is 1 and 2 respectively, poly(3-hydroxybutyrate-co-4-hydroxybutyrate)is made up of monomers where a is 1 and b is 1 for the 3-hydroxybutyrate monomer, and a is 2 and b is 0 for the 4-hydroxybutyrate monomer. Poly(3-hydroxybutyrate-co-3-hydroxyhexanoate), P(3H-co-3HHx), consists of the monomers where a is 1 for both monomers, and b is 1 and 3 respectively. Poly(3-hydroxybutyrate-co-3-hydroxyalkanoate)s may have 3-hydroxyalkanoate co-monomer content varying from 3 mole percent to 15 mole percent. The chain length of the 3-hydroxyalkanoate co-monomer may vary, for example, from $C_7$ up to $C_{19}$. In some embodiments, the PHA is a copolymer containing hydroxybutyrate such as 3-hydroxy butyrate or 4-hydroxybutyrate.

The term "poly(lactic acid)" (PLA) as used herein refers to a polymer or copolymer containing at least 50 mole percent of lactic acid monomer or derivatives thereof. PLA polymers may in some embodiments range in weight average molecular weight from about 50,000 to about 300,000. Examples of poly(lactic acid) include, but are not limited to, (a) a homopolymer of lactic acid or derivatives thereof, and (b) copolymers of lactic acid or derivatives thereof that further include as polymerized units one or more monomers selected from aliphatic hydroxycarboxylic acids, aliphatic polyhydric alcohols, or aliphatic polycarboxylic acids or combinations thereof. Examples of copolymers include but are not limited to (i) a copolymer of lactic acid with one or more aliphatic hydroxycarboxylic acids other than lactic acid, (ii) a copolymer of lactic acid with an aliphatic polyhydric alcohol and an aliphatic polycarboxylic acid, (iii) a copolymer of lactic acid with an aliphatic polycarboxylic acid, (iii) a copolymer of lactic acid with an aliphatic polyhydric alcohol, and (iv) a mixture of two or more polymers selected from one or more homopolymers of (a) and/or copolymers of (b).

Examples of lactic acid monomer or derivatives thereof include L-lactic acid, D-lactic acid, DL-lactic acid, a cyclic dimer thereof (i.e., L-lactide, D-lactide or DL-lactide) or mixtures thereof. Examples of the hydroxycarboxylic acid, other than lactic acid of the copolymers (b) above include, but are not limited to, glycolic acid, hydroxybutyric acid, hydroxyvaleric acid, hydroxycaproic acid or hydroxyheptoic acid. Examples of aliphatic polyhydric alcohol monomers useful in the copolymers (b) above include, but are not limited to, ethylene glycol, 1,4-butanediol, 1,6-hexanediol, 1,4-cyclohexanedimethanol, neopentyl glycol, decamethylene glycol, glycerin, trimethylolpropane or pentaerythritol or mixtures thereof. Examples of the aliphatic polycarboxylic acid monomers useful in the above copolymers (b) above include, but are not limited to, succinic acid, adipic acid, suberic acid, sebacic acid, dodecanedicarboxylic acid, succinic anhydride, adipic anhydride, trimesic acid, propanetricarboxylic acid, pyromellitic acid or pyromellitic anhydride or mixtures thereof.

It has surprisingly been found that when particular peroxides, for example, certain organic peroxides, are reacted with certain polymers, such as PHAs and/or PLA, the compositions foam to give density reduction. In particular, peroxyesters such as peroxycarbonates were unexpectedly found to lower the density of compositions comprising PHA, particularly when included at or above 1 weight percent (e.g., between about 1 weight percent to about 5 weight percent) based on the total weight of the composition.

The present invention provides methods and compositions for making a foamed thermoplastic material. In some embodiments, the foamed thermoplastic material is biodegradable or biobased. An embodiment of a method according to the present invention comprises processing a composition containing (a) at least one thermoplastic material selected from polyhydroxyalkanoates (PHAs), poly(lactic acid) (PLA), or combinations thereof; and (b) at least one organic peroxide under conditions effective to permit the composition to foam. The "composition" refers to the composition that is processed to provide the resulting foamed thermoplastic material and is also referred to herein as the "starting composition," the "composition to be processed to provide a foam," or the "composition useful for forming a foamed thermoplastic material." As used herein, "PHA and/or PLA" refers to at least one thermoplastic material selected from polyhydroxyalkanoates (PHAs), poly(lactic acid) (PLA), or combinations thereof.

In certain embodiments, the at least one thermoplastic material of the present invention includes at least one PHA and does not include PLA. For example, in one embodiment, the at least one thermoplastic material consists of a single PHA only (e.g., PHBV), or in other embodiments includes a mixture of PHAs or a mixture of at least one PHA with at least one additional non-PHA thermoplastic material.

Examples of PHA containing thermoplastic materials include for example a blend of at least one PHA with at least one biopolymer such as starch, cellulose, or another polysaccharide, or blends of at least one PHA with other biodegradable polyesters such as BASF's Ecoflex®. The at least one PHA in one embodiment is PHBV (poly-β-hydroxy butyrate-co-valerate) available commercially from Tianan Biologic Material Co.

In other embodiments, the at least one thermoplastic material of the present invention includes PLA and does not include a PHA. For example, the at least one thermoplastic material may consist of a single thermoplastic PLA (i.e., PLA only) or mixtures of PLA, or may comprise a mixture of PLA with at least one additional thermoplastic polymer. The thermoplastic material may comprise a blend of PLA with at least one biodegradable polyester, or a blend of PLA with another biopolymer, such as starch, cellulose, or another polysaccharide.

In other embodiments, the at least one thermoplastic material of the present invention includes a blend of at least one PHA with PLA. In one embodiment, the thermoplastic material comprises a blend of PLA, at least one PHA, and at least one additional biopolymer, such as starch, cellulose, or another polysaccharide and/or at least one biodegradable polyester such as BASF's Ecoflex®.

Other non-PHA or non-PLA thermoplastic materials may be included in the composition. For example, conventional thermoplastic materials such as polyethylene, polypropylene, acrylic based polymers such as polymethylmethacrylate, polyethylene terephthalate, polybutylene terephalate, polyvinyl chloride, polystyrene, polyvinyl acetate or polycarbonate may be included with the PHA and/or PLA.

In certain embodiments the thermoplastic material is comprised of at least 70 weight percent, at least 80 weight percent, at least 90 weight percent, or 100 weight percent biodegradable and/or biobased thermoplastic materials based on the total weight of the thermoplastic material. In other embodiments, the thermoplastic material is comprised of at least 80 weight percent, at least 90 weight percent or 100 weight percent biodegradable thermoplastic materials based on the total weight of the thermoplastic material.

In certain embodiments, the thermoplastic material containing a PHA and/or PLA is present in an amount of about 5 weight percent to about 95 weight percent and in other embodiments from about 30 weight percent to about 95 weight percent based on the total weight of the composition to be processed to provide a foamed thermoplastic material. In certain embodiments, the amount of PHA and/or PLA relative to the total amount of thermoplastic material in the composition is from about 15 weight percent to 100 weight percent and in other embodiments from about 30 weight percent to 100 weight percent based on the total weight of the thermoplastic material.

Exemplary types of organic peroxides useful in the present invention include dialkyl peroxides, alkylarylperoxides, hydroperoxides (e.g., alkyl hydroperoxides, alkylaryl hydroperoxides), peroxyacids (peracids), organic peroxyesters (peresters), diacyl peroxides, diperoxyketals, ketone peroxides, peroxyoxalates, or mixtures thereof. Such organic peroxides may be present in the composition in an amount of at least about 0.5 weight percent, at least about 1 weight percent, at least about 2 weight percent, and up to and including about 10 weight percent, based on the total weight of the composition. In some embodiments, the amount of organic peroxide ranges from about 0.5 weight percent to about 7 weight percent, and in other embodiments from about 1 weight percent to about 6 weight percent based on the total weight of the composition.

In certain embodiments, the organic peroxide is selected from one or more organic peroxyesters, diperoxyketals, dialkylperoxides or alkylarylperoxides or mixtures thereof. In other embodiments the organic peroxide is selected from organic peroxyesters, or diperoxyketals, or mixtures thereof.

As used herein, "organic peroxyesters" include, but are not limited to, peroxyesters, monoperoxycarbonates, diperoxycarbonates, peroxydicarbonates, or peroxytricarbonates or mixtures thereof. The at least one organic peroxyester may be, for example, a peroxyester having a structure $R^1OOC(=O)R^2$, a monoperoxycarbonate having a structure $R^1OOC(=O)OR^2$, diperoxycarbonate having a structure $R^1OOC(=O)OOR^2$, or a peroxydicarbonate, or peroxytricarbonate having a structure $[R^1OOC(=O)O]_nR^2$ or mixtures thereof, with n=2 or 3 respectively, where $R^1$ and $R^2$ each being independently selected from a $C_2$-$C_{10}$ alkyl group (e.g., ethyl, n-propyl, amyl, i-propyl, t-butyl, n-butyl, sec-butyl, 2-ethylhexyl, cyclohexyl). The alkyl groups may be cyclic, linear, or branched. Oligomeric and polymeric peroxycarbonates, such as poly(tert-butyl peroxycarbonate) polyether may also be used.

The at least one organic peroxyester in one embodiment is a monoperoxy-carbonate. Examples of monoperoxycarbonates include OO-tert-butyl-O-(2-ethylhexyl)-monoperoxycarbonate (available commercially from Arkema under the trade name Luperox® TBEC), OO-tert-amyl-O(2-ethylhexyl)monoperoxycarbonate, or OO-tert-butyl-O-isopropyl monoperoxy-carbonate or mixtures thereof.

Examples of diperoxycarbonates include dialkyl diperoxycarbonates such as diisopropyl diperoxycarbonate, bis (2-ethylhexyl)diperoxycarbonate, or di-t-butyl diperoxycarbonate or mixtures thereof.

Examples of peroxydicarbonates include di(n-propyl)peroxydicarbonate, di(sec-butyl)peroxydicarbonate, or di(2-ethylhexyl)peroxydicarbonate or mixtures thereof.

Examples of peroxyesters include 1,1-dimethyl-3-hydroxybutyl peroxyneodecanoate, α-cumyl peroxyneodecanoate, α-cumyl peroxyneoheptanoate, tert-amyl peroxyneodecanoate, tert-butyl peroxyneodecanoate, tert-amyl peroxypivalate, tert-butyl peroxypivalate, 2,5-di(2-ethylhexanoylperoxy) 2,5-dimethyl hexane, tert-amyl peroxy-2-ethylhexanoate, tert-butyl peroxy-2-ethylhexanoate, tert-amyl peroxyacetate, tert-butyl peroxyacetate, tert-amyl perbenzoate, or tert-butyl peroxybenzoate, or mixtures thereof.

Examples of dialkyl and alkylaryl peroxides include dicumyl peroxide, 2,5-di(tert-butylperoxy)-2,5-dimethylhexane, tert-butyl cumyl peroxide, α,α-bis(tert-butylperoxy)diisopropylbenzene, di(tert-amyl)peroxide, di(tert-butyl)peroxide, or 2,5-di(tert-butylperoxy)-2,5-dimethyl-3-hexyne or mixtures thereof.

Examples of diacyl peroxides include decanoyl peroxide, lauroyl peroxide, succinic acid peroxide, or benzoyl peroxide or mixtures thereof.

Examples of diperoxy ketals include 1,1-di(tert-butylperoxy)-3,3,5-trimethylcyclohexane, 1,1-di(tert-butylperoxy) cyclohexane, 1,1-di(tert-amylperoxy)cyclohexane, n-butyl 4,4-di(tert-butylperoxy)valerate, ethyl 3,3-di(tert-amylperoxy)butyrate, or ethyl 3,3-di(tert-butylperoxy)butyrate, or mixtures thereof.

Examples of hydroperoxides include cumene hydroperoxide, diisoproplybenzene hydroperoxide, tert-butyl hydroperoxide, or tert-amyl hydroperoxide or mixtures thereof.

Examples of ketone peroxides include methyl ethyl ketone peroxide, 2,4-pentanedione peroxide, or mixtures thereof.

In some embodiments, an amount of organic peroxide is employed in the composition which is sufficient to reduce the density of the resulting foamed thermoplastic material at least 25%, at least 40%, at least 60%, or at least 80% relative to an analogous PHA and/or PLA composition that has not been processed with an organic peroxide.

In one embodiment, the composition to be processed to provide a foam contains, between about 0.5 weight percent to about 10 weight percent, or about 1 weight percent to about 5 weight percent of one or more organic peroxyesters, based on the total weight of the composition. In an exemplary embodiment, the composition comprises more than about 1 weight percent organic peroxyester, or at least about 2 weight percent, or at least about 3 weight percent, or at least about 5 weight percent organic peroxyester based on the total weight of the composition. In one embodiment, depending on the level of organic peroxyester used, the density of the resulting foamed biodegradable thermoplastic material is reduced by at least about 45% and in other embodiments at least about 60%, at least about 75%, or at least about 85% compared to a PHA and/or PLA composition that has not been processed with an organic peroxyester.

A foamed thermoplastic material according to the present invention and/or a composition that is processed to form the foamed thermoplastic material, may optionally contain one or more additional additives known for use in thermoplastics, including, but not limited to fillers, process aids, impact modifiers, colorants, pigments, flame retardants, dyes, stabilizers (including UV stabilizers), lubricants, plasticizers, surfactants, biodegradability accelerants, or combinations thereof. In some embodiments, these optional additives may be present in an amount of up to about 50 weight percent based on total weight of the composition.

In some embodiments, the foamed thermoplastic material or composition that is processed may include one or more acrylic copolymers such as those disclosed in U.S. Pat. No. 7,666,946 and U.S. patent application no. 2010/0267867, the disclosures of which are hereby incorporated by reference in their entirety. Such acrylic copolymers may be present in the composition to be processed in an amount of about 0.1 weight percent to about 15 weight percent based on the total weight of the composition.

"Acrylic copolymers" as used herein, refers to copolymers having 60 weight percent or more of acrylic and/or methacrylic monomer units based on the total weight of the acrylic copolymer. "(Meth)acrylate" is used herein to include both the acrylate, methacrylate or a mixture of both the acrylate and methacrylate. Useful acrylic monomers include, but are not limited to methyl(meth)acrylate, ethyl (meth)acrylate, n-propyl(meth)acrylate, isopropyl(meth) acrylate, n-butyl(meth)acrylate, isobutyl(meth)acrylate, sec-butyl(meth)acrylate, tert-butyl(meth)acrylate, amyl(meth) acrylate, isoamyl(meth)acrylate, n-hexyl(meth)acrylate, cyclohexyl(meth)acrylate, 2-ethylhexyl(meth)acrylate, pentadecyl(meth)acrylate, dodecyl(meth)acrylate, isobornyl (meth)acrylate, phenyl(meth)acrylate, benzyl(meth)acrylate, phenoxyethyl(meth)acrylate, 2-hydroxyethyl(meth) acrylate or 2-methoxyethyl(meth)acrylate. In some embodiments, the acrylic monomers include methyl acrylate, ethyl acrylate, butyl acrylate, 2-ethyl-hexyl-acrylate, methyl methacrylate, ethyl methacrylate, or butyl methacrylate.

In addition to the acrylic monomer units, the acrylic copolymer useful in the invention can also include up to 40 weight percent of other ethylenically unsaturated monomers polymerizable with the acrylic monomers based on the total weight of acrylic copolymer, including, but not limited to styrene, alpha-methyl styrene, butadiene, vinyl acetate, vinylidene fluorides, vinylidene chlorides, acrylonitrile, vinyl sulfone, vinyl sulfides, and vinyl sulfoxides. In one embodiment, the copolymer contains styrene.

In one embodiment, the acrylic copolymer contains both acrylate and methacrylate monomer units. For example in one embodiment, a terpolymer of methyl methacrylate-butyl acrylate-butyl methacrylate with a butyl methacrylate content of about 20 weight percent and having a weight average molecular weight of about 300,000 g/mol may be used.

In another embodiment, the acrylic copolymer comprises 10 weight percent to 75 weight percent of methyl methacrylate units, 10 weight percent to 50 weight percent of butyl acrylate units, 0 to 50 weight percent of butyl methacrylate units, and from 0 to 80 weight percent of styrene, the total adding to 100 percent.

In other embodiments, the foamed thermoplastic material or composition that is processed may include one or more impact modifiers, such as those disclosed in U.S. Ser. No. 12/515,640 filed May 20, 2009 (corresponding to WO 2008/063988) and US patent application publication no. 2011/0082224, the disclosures of which are hereby incorporated by reference in their entirety. Such impact modifiers may be present in the composition to be processed in an amount of 0.1 weight percent to 15 weight percent based on the total weight of the composition.

The impact modifier can be a linear block copolymer or a core/shell impact modifier. Useful linear block copolymers include, but are not limited to, acrylic block copolymers, and SBM-type (styrene, butadiene, methacrylate) block copolymers. The block copolymers may consist of at least one "hard" block, and at least one "soft" block. The hard blocks generally have a glass transition temperature (Tg) of greater than 20° C., and more preferably greater than 50° C. The hard block can be chosen from any thermoplastic polymer meeting the Tg requirements. Preferably, the hard block is composed primarily of methacrylate ester units, styrenic units, or a mixture thereof. The soft blocks generally have a Tg of less than 20° C., and preferably less than 0° C. Preferred soft blocks include polymers and copolymers of alkyl acrylates, dienes, styrenics, and mixtures thereof. Preferably the soft block is composed mainly of acrylate ester units or dienes.

Core-shell (multi-layer) impact modifiers may have a soft (rubber or elastomer) core and a hard shell, or a hard core covered with a soft elastomer-layer, and a hard shell, or other core-shell morphology known in the art. The rubber layers are composed of low glass transition (Tg) polymers, including, but not limited to, butyl acrylate (BA), ethylhexyl acrylate (EHA), butadiene (BD), butylacrylate/styrene, and many other combinations.

The preferred glass transition temperature (Tg) of the elastomeric layer should be below 25° C. The elastomeric or rubber layer is normally crosslinked by a multifunctional monomer for improved energy absorption. Crosslinking monomers suitable for use as the crosslinker in the core/shell impact modifier are well known to those skilled in the art, and are generally monomers copolymerizable with the monounsaturated monomer present, and having ethylenically multifunctional groups that have approximately equal reactivity. Examples include, but are not limited to, divinylbenzene, glycol of di- and trimethacrylates and acrylates, triol triacrylates, methacrylates, and allyl methacrylates, etc. A grafting monomer may be used to enhance the interlayer grafting of impact modifiers and the matrix/modifier particle grafting. The grafting monomers can be any polyfunctional crosslinking monomers.

For soft core multi-layered impact modifies, the core may range from 30 weight percent to 85 weight percent of the impact modifier, and outer shells may range from 15 weight percent to 70 weight percent of the impact modifier. The crosslinker in the elastomeric layer ranges from 0 to 5.0 weight percent. The synthesis of core-shell impact modifiers is well known in the art, and there are many references, for example U.S. Pat. Nos. 3,793,402, 3,808,180, 3,971,835, and 3,671,610, all of which are incorporated herein by reference.

Other non-core/shell impact modifiers are also possible for use in this invention. For example butadiene rubber can be incorporated into an acrylic matrix to achieve high ballistic resistance property.

A preferred MBS type core/shell polymer is one having a 70 weight percent to 85 weight percent core of 80 weight percent to 100 weight percent butadiene and 0 to 20 weight percent styrene, and a shell comprised of 75 weight percent to 100 weight percent methyl methacrylate, 0 to 20 weight percent butyl acrylate and 0 to 25 weight percent ethyl acrylate.

In one embodiment, the acrylic copolymer impact modifier is an acrylate based copolymer with a core-shell polymer having a rubbery core, such as 1,3-dienes (also copolymers with vinyl aromatics) and/or alkyl acrylates with alkyl group containing 4 or more carbons and the shell is grafted onto the core and is comprised of monomers such as vinyl aromatics (e.g., styrene), alkyl methacrylates (alkyl group having 1-4 carbons), alkyl acrylates (alkyl group having 1-4 carbons), and/or acrylonitrile.

In one embodiment, acrylic type core/shell polymer is one having a 70 to 85 weight percent core of 0 to 75 weight percent butyl acrylate, 10 weight percent to 100 weight percent 2-ethylhexyl acrylate and 0 to 35 weight percent butadiene, and a shell comprised of 75 weight percent to 100 weight percent methyl methacrylate, 0 to 20 weight percent butyl acrylate and 0 to 25 weight percent ethyl acrylate.

In some embodiments, the core-shell impact modifier has a number average particle size of over 250 nm, from 250 to 400 nm, or in some embodiments from 280 to 330 nm. The core-shell impact modifier can be a blend of two or more sizes or chemical compositions.

In one embodiment, the composition to be processed to provide a foam consists essentially of, or consists only of, PHA and/or PLA, an organic peroxyester, optionally one or more additional biodegradable or biobased thermoplastic materials, and optionally one or more additional additives (such as those mentioned above).

In other embodiments, the composition to be processed to provide a foam contains PHA and/or PLA, an organic peroxyester, an additional chemical or physical blowing agent, optionally one or more additional thermoplastic materials, and optionally one or more additional additives (such as those mentioned above). Thus, the starting composition in such an embodiment includes any volatile foaming agent, or organic or inorganic chemical or physical blowing agent such as carbon dioxide, $N_2$, low boiling hydrocarbons (e.g., propane, isobutane), low boiling halocarbons, azo compounds such as azobisformamide (also commonly known as azodicarbonamide), or 5-phenyl tetrazole, benzene sulfonyl hydrazide, citric acid, or bicarbonates such as sodium bicarbonate or mixtures thereof.

In one embodiment, the composition to be processed to provide a foam is characterized by the substantial absence or complete absence of any volatile substance capable of functioning as a foaming or blowing agent. Thus, the starting composition in such an embodiment is free or substantially free of any conventional volatile foaming agent such as those mentioned herein.

In some embodiments, the starting composition is processed at a temperature effective to initiate decomposition of the at least one organic peroxide, such as the organic peroxyester. In another embodiment, the composition is processed at a temperature effective to generate one or more volatile substances from at least one of i) the at least one organic peroxide such as the organic peroxyester and/or ii) the PHA and/or PLA, the one or more volatile substances being sufficiently volatile to effect foaming of the composition. The one or more volatile substances generated from the at least one organic peroxide and/or the PHA and/or PLA may include, for example, oxygen, water, carbon dioxide, a low boiling hydrocarbon, or an oxygen-containing hydrocarbon. In another embodiment, the composition is processed at a temperature at which the at least one organic peroxide has a half life of from about 1 second to about 5 minutes, or about 1 second to 1 minute. In another embodiment, the starting composition is processed (e.g., melt processed) at a temperature of from about 140° C. to about 200° C., or about 170° C. to 190° C.

"Processing" the composition according to the present invention refers to reacting the PHA and/or PLA with the at least one organic peroxyester under conditions effective to permit the composition to foam. "Processing" the composition may be done according to any known method, including but not limited to melt processing, injection molding, extrusion (this can be done, for instance, by single-screw extrusion, twin-screw extrusion, Buss kneader, two-roll mill, or impeller mixing), calendaring, blow molding, or thermoforming. Formation of the blend is not limited to a single-step formation. The thermoplastic material and organic peroxyester may be blended prior to processing the composition (e.g., prior to melt processing or extruding the composition), or may be blended during the processing of the composition (e.g., during melt processing or extrusion). In certain embodiments, methods according to the present invention include a further step of forming the composition into a molded article, such as disposable tableware, a disposable container, packaging material (e.g., food packaging), or insulation. For example, the composition may be injected while molten into a mold and permitted to expand (foam) to assume the shape of the mold.

In one embodiment, a method for making a foamed thermoplastic material comprises processing a composition containing (a) at least one biodegradable thermoplastic material comprising PHBV (poly-β-hydroxy butyrate-co-valerate)polyhydroxy; and (b) at least one organic peroxycarbonate at a temperature of from about 150° C. to about 200° C. (e.g., about 170° C.), wherein the composition contains, based on total weight of the composition, between about 1 weight percent to about 5 weight percent of the at least one organic peroxycarbonate.

The present invention provides foamed thermoplastic materials obtained by the methods described above. In some embodiments the foamed thermoplastic materials are biodegradable. The invention further contemplates molded articles that comprise the foamed thermoplastic materials such as biodegradable thermoplastic materials made according to such methods. Useful articles that can be made using methods of the present invention include but are not limited to disposable tableware, disposable containers, packaging materials (e.g., food packaging), and insulation. Foamed thermoplastic materials of the present invention provide a low density and lightness in weight, can be used in a variety of useful articles spanning many industries, and may have, depending on the selection of other thermoplastic materials, excellent biodegradability compared to foamed polymers derived from non-renewable resources. A variety of other useful articles and processes for forming those articles can be contemplated based on the present disclosure.

The following examples are provided to describe the invention in further detail. It is intended to illustrate, not limit, the invention.

EXAMPLE 1

PHA was purchased from Tianan Biologic and used as received. PHA samples were dry blended with organic peroxides shown below: (Table 1: Luperox® TBEC peroxide (OO-tert-butyl-O-(2-ethylhexyl)-monoperoxycarbonate; Table 2: Luperox® P peroxide (t-butyl peroxybenzoate); Table 3: Luperox® Solar Pro peroxide (peroxyesters)) and melt processed using a moving die rheometer (Monsanto MDR 2000E) oscillating at 100 cpm in a 1° arc. All samples were processed at a constant temperature of 170° C. for 5 minutes.

TABLE 1

Molecular Weight and Density data for PHA Samples Processed with Luperox ® TBEC Peroxide

| sample | density [g/cc] |
| --- | --- |
| processed PHA | 1.13 |
| PHA + 1% Luperox ® TBEC | 0.56 |
| PHA + 3% Luperox ® TBEC | 0.20 |
| PHA + 5% Luperox ® TBEC | 0.17 |

TABLE 2

Molecular Weight and Density data for PHA Samples Processed with Luperox ® P Peroxide (t-Butyl Peroxybenzoate):

| sample | density [g/cc] |
| --- | --- |
| PHA + 3% Luperox ® P | 0.36 |
| PHA + 5% Luperox ® P | 0.43 |

TABLE 3

Molecular Weight and Density data for PHA Samples Processed with Luperox ® Solar Pro Peroxide (peroxyesters):

| sample | density [g/cc] |
|---|---|
| 1% Luperox ® Solar Pro | 0.83 |
| 3% Luperox ® Solar Pro | 0.73 |
| 5% Luperox ® Solar Pro | 0.70 |

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A method for making a foamed thermoplastic material comprising processing a composition consisting essentially of (a) at least one polyhydroxyalkanoates (PHAs) and optionally one or more poly(lactic acids) (PLA) and/or biopolymer selected from the group consisting of starch, cellulose, and polysaccharides, (b) at least 1 weight percent or more based on the total weight of the composition of at least one organic peroxide, and (c) optionally one or more additives selected from the group consisting of process aids, impact modifiers, colorants, pigments, flame retardants, dyes, stabilizers, lubricants, surfactants, and biodegradability accelerants, under conditions effective to permit said composition to foam; wherein said composition is processed at a temperature effective to generate one or more volatile substances from at least one of: i) the at least one organic peroxide and/or ii) the at least one PHA, the one or more volatile substances being sufficiently volatile to effect foaming of the composition, such that said method is performed in the absence of any additional volatile substance capable of functioning as a foaming or blowing agent.

2. The method of claim 1, wherein the at least one organic peroxide is an organic peroxyester.

3. The method of claim 1, wherein the PHA consists essentially of one or more homopolymers or copolymers containing 3-hydroxybutyrate or 4-hydroxybutyrate or mixtures thereof.

4. The method of claim 1, wherein the at least one PHA consists essentially of one or more of poly(3-hydroxybutyrate), poly(4-hydroxybutyrate), poly(3-hydroxyvalerate), poly(3-hydroxyhexanoate), poly(3-hydroxyoctanoate), poly(3-hydroxydecanoate), poly-3-hydroxy butyrate-co-valerate, poly(3-hydroxybutyrate-co-4-hydroxybutyrate), poly(3-hydroxybutyrate-co-3-hydroxyhexanoate or poly(3-hydroxybutyrate-co-3-hydroxy $C_7$ to $C_{19}$ alkanoate).

5. The method of claim 1 wherein said foamed thermoplastic material is biodegradable.

6. The method of claim 1, wherein said foamed thermoplastic material consists essentially of PHA.

7. The method of claim 5, wherein the at least one foamed biodegradable thermoplastic material consists essentially of a blend of at least one PHA and PLA.

8. The method of claim 1, wherein the at least one organic peroxide is selected from one or more dialkyl peroxides, alkylarylperoxides, hydroperoxides, peroxyacids, organic peroxyesters, diacyl peroxides, diperoxyketals, ketone peroxides, peroxyoxalates, or mixtures thereof.

9. The method of claim 8, wherein the at least one organic peroxide is selected from one or more organic peroxyesters, diperoxyketals, dialkylperoxides or alkylarylperoxides or mixtures thereof.

10. The method of claim 9, wherein the at least one organic peroxide is selected from one or more organic peroxyesters, or diperoxyketals, or mixtures thereof.

11. The method of claim 2, wherein the one or more organic peroxyesters have a structure $R^1OOC(=O)R^2$, $R^1OOC(=O)R^2$, $R^1OOC(=O)OOR^2$, or $[R^1OOC(=O)O]_nR^2$, with n =2 or 3, and with $R^1$ and $R^2$ being independently selected from the group consisting of $C_2$ to $C_{10}$ alkyl groups.

12. The method of claim 2, wherein the composition is processed at a temperature at which the one or more organic peroxyesters have a half life of from about 1 second to about 5 minutes.

13. The method of claim 1, wherein the composition consists essentially of, based on total weight of the composition, from 1 weight percent to about 5 weight percent of the at least one organic peroxide.

14. The method of claim 1, wherein the processing step comprises melt processing the composition, extruding the composition or injection molding the composition.

15. The method of claim 1, comprising a further step of forming the composition into a molded article.

16. The method of claim 1, wherein the composition is processed at a temperature of from about 150° C. to about 200° C.

* * * * *